United States Patent [19]
Thompson

[11] 3,821,670
[45] June 28, 1974

[54] WAVEGUIDE ALIGNMENT AND QUICK DISCONNECT COUPLER

[75] Inventor: Richard M. Thompson, Fullerton, Calif.

[73] Assignee: Hughes Aircraft Company, Culver City, Calif.

[22] Filed: July 11, 1973

[21] Appl. No.: 378,108

Related U.S. Application Data

[63] Continuation-in-part of Ser. No. 248,883, May 1, 1972, abandoned.

[52] U.S. Cl................ 333/98 R, 285/330, 285/414
[51] Int. Cl........................... H01p 1/04, F16l 19/02
[58] Field of Search.......... 333/98 R; 285/414, 330; 403/342

[56] References Cited
UNITED STATES PATENTS
2,774,616   12/1956   Dodd et al. .................... 285/414
3,076,948   2/1963   Misner ............................ 333/98 R FOREIGN PATENTS OR APPLICATIONS
654,135   6/1951   Great Britain .................... 333/98 R

*Primary Examiner*—James W. Lawrence
*Assistant Examiner*—Wm. H. Punter
*Attorney, Agent, or Firm*—W. H. MacAllister; Lawrence V. Link, Jr.

[57] ABSTRACT

A universal type waveguide flange aligning and quick-release assembly for coupling and decoupling abutting waveguide flanges rapidly and for providing a substantially loss free connection. The coupler which is useful for either square, substantially square or round flanges includes a first cylindrical portion having an inner flat shoulder surface or counter bored face and a threaded annular ring axially surrounding the inner shoulder surface. A plurality of dowel pins are slideably mounted in the shoulder surface in positions corresponding to the waveguide flange holes. The first cylindrical portion has an internal axial opening greater than the diameter of the shoulder structure of the waveguide flange for its attachment to the waveguide. A second cylindrical portion of the coupler includes an internal flat shoulder surface or counter bored face and an annular ring axially surrounding the inner shoulder surface and having threads thereon for engaging the threads of the first portion. The second portion also has an internal axial opening greater than the diameter of the flange supporting structure. In some arrangements of the invention, a slot having sides parallel to the diameter of the cylindrical structures is provided in both cylindrical portions to allow a waveguide to pass through to the internal axial opening.

The invention herein described was made in the course of or under a contract or subcontract thereunder with the Navy.

6 Claims, 7 Drawing Figures

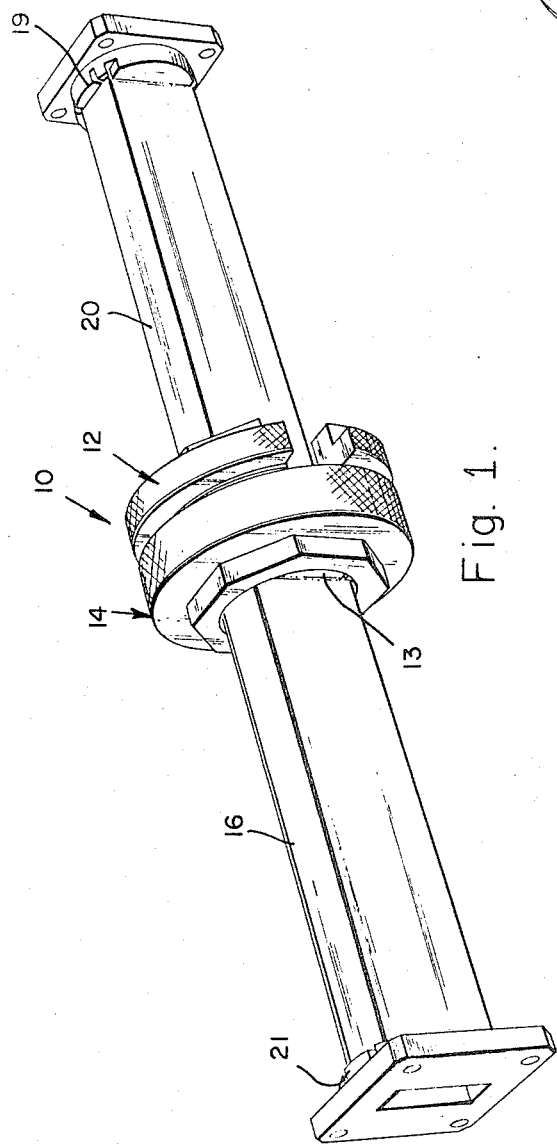
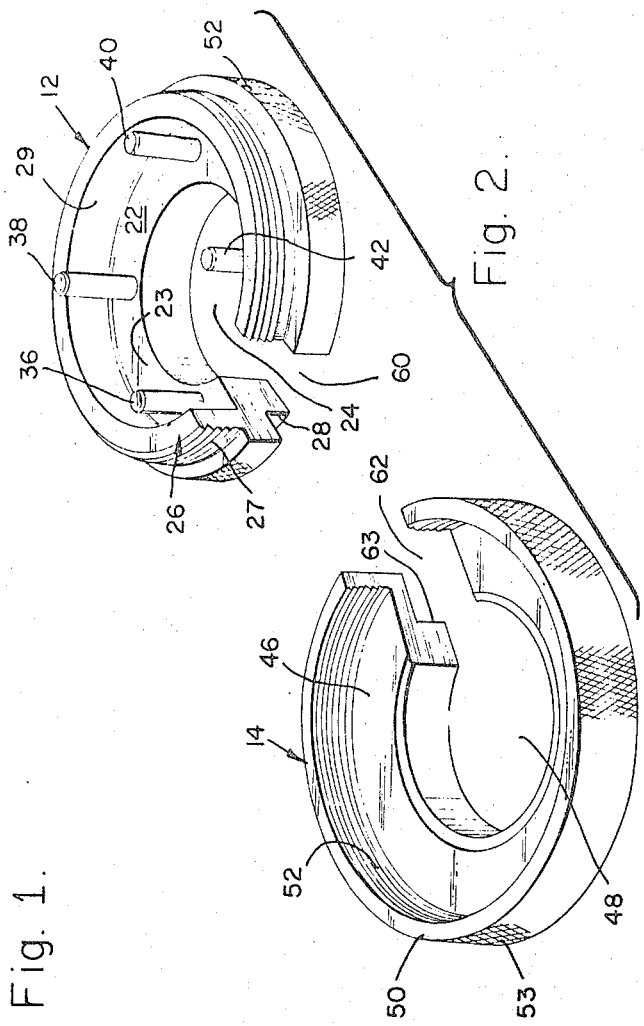

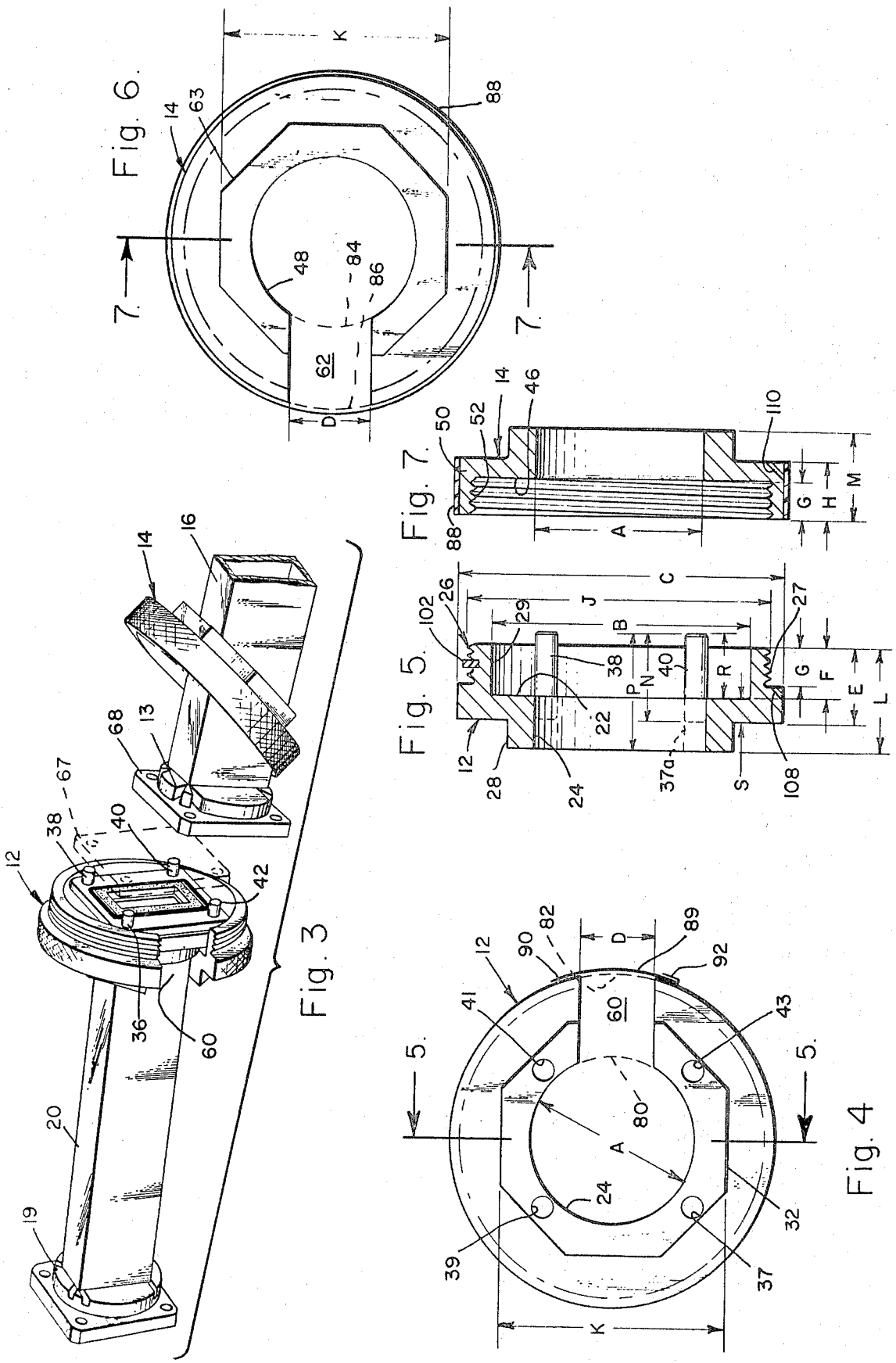

WAVEGUIDE ALIGNMENT AND QUICK DISCONNECT COUPLER

CROSS-REFERENCE TO A RELATED APPLICATION

This application is a continuation-in-part of U.S. Pat. application Ser. No. 248,883; for Waveguide Alignment and Quick Disconnect Coupler; filed May 1, 1972; now abandoned.

BACKGROUND OF THE INVENTION

1. Field of the Invention

This invention relates to waveguide coupling devices and particularly to a waveguide flange aligning and quick-release coupler of simple construction that provides a coupling having minimum RF leakage.

2. Description of the Prior Art

Waveguides are conventionally coupled by bolting the flanges together with as even a pressure as can be developed with all bolts providing an equal force on the flanges. For quick disconnect coupling of waveguide flanges such as for laboratory use or in equipment where a portion of the microwave structure may be required to be rapidly removed and replaced, coupling has been made by using screws, loose dowel pins, C clamps, a pair of cylindrically or cup-shaped threadably engagable sections as provided by Mil specifications MIL-C-3,9004/1 or half hinge type couplers fixedly attached to one flange of the two adjoining waveguides. Bolting the adjacent flanges together has been found to be time consuming and provides a lossy connection. Simple clamping arrangements have been found to have the disadvantage of providing a lossy connection and preventing a sliding removal of a waveguide section from fixed adjacent waveguide sections. The Mil Spec quick disconnect flange couplers each have an annular shoulder with an axial opening and an external circumferential threaded ring for tightening the shoulders against the waveguide flange. This Mil Spec quick disconnect coupler does not include an arrangement for aligning the waveguide flanges or waveguides being coupled so that it has been found to be relatively lossy and not readily providing adequate electrical continuity, resulting in arcing in the waveguide. A quick-release waveguide coupler that would provide quick and accurate alignment and a substantially loss free connection would be a significant advantage to the art.

SUMMARY OF THE INVENTION

A waveguide flange aligning and quick-release coupler useful with either square or round flanges and including first and second cylindrical portions each having an internal annular shoulder, an axial opening and a circumferential threaded ring. The internal axial opening is larger than the largest dimension of the mounting shoulder of the waveguide flange being coupled. In some arrangements, in accordance with the invention, each ring portion has a slot from the outer circumference to the axial opening so that the cylindrical portions may be inserted onto the waveguide. The first cylindrical portion has dowel pins positioned in the flat surface of the shoulder to correspond to the standard bolt holes in the flanges to be coupled; and the dowel pins are slideably mounted along the dimension normal to the surface of the shoulder to provide for self-adjustment of the length of the dowel pins which extend pass the surface of the shoulder. The external ring of this first portion has external male threads along at least a portion thereof. The second cylindrical portion has its internal shoulder surface flat and has internal female threads around at least a portion of the external ring to attach to the threads of the first ring portion. At the external axial ends of the first and second cylindrical portions, suitable wrench flats may be provided for assistance in pressure coupling of the two portions. For assembly, with both the first and second ring portions on the waveguide sections, the dowel pins of the first cylindrical portion are positioned through the holes in the flange, any seals or windows are then positioned on the dowel pins and the second cylindrical section is then positioned to be threadably engaged to the first ring portion. The coupler can be utilized with any standard flange types or combinations thereof and has been found to provide a very low RF (radio frequency) loss between coupled waveguides.

It is therefore an object of this invention to provide a quick-release waveguide coupler.

It is a further object of this invention to provide a simplified and flange aligning waveguide coupler.

It is still a further object of this invention to provide a waveguide coupler that is useful with substantially any type of waveguide flanges with sealing or window devices provided therebetween.

It is another object of this invention to provide an improved and simplified waveguide coupler that establishes and maintains a coupling that has a relatively low radio frequency loss.

BRIEF DESCRIPTION OF THE DRAWINGS

These and other objects, features and advantages of the invention itself will become apparent to those skilled in the art in the light of the following detailed description, taken in consideration with the accompanying drawings, wherein like reference numerals indicate like or corresponding parts throughout the several parts wherein:

FIG. 1 is a schematic perspective diagram showing the improved waveguide coupler in accordance with the invention, assembled to couple a pair of waveguide flanges;

FIG. 2 is a schematic perspective diagram showing the first and second cylindrical or cup portions of the waveguide coupler in accordance with the invention;

FIG. 3 is a schematic perspective diagram showing the coupler of the invention during an assembly operation of coupling a pair of waveguides;

FIG. 4 is a schematic plan view of the fixed cylindrical portion of the waveguide coupler of the invention;

FIG. 5 is a schematic section taken at line 5—5 of FIG. 4;

FIG. 6 is a schematic plan view of the rotatable cylindrical portion of the waveguide coupler of the invention; and FIG. 7 is a schematic sectional view taken at line 7—7 of FIG. 6.

DESCRIPTION OF THE PREFERRED EMBODIMENT

Referring first to the perspective views of FIGS. 1 and 2, the waveguide coupler 10 of FIG. 1 is shown with cylindrical portions 12 and 14 joining first and second waveguide sections 16 and 20. Couplers such as the coupler 10 may be utilized for joining any number of waveguides, such as, for example, by coupling at opposite ends a removable unit in a waveguide maze. When assembled, the rotatable ring portion 14 is screwed or threadably engaged onto the fixed ring assembly 12 until the desired pressure joint is provided between the flanges of the waveguides 16 and 20. The fixed ring portion includes a shoulder section 22 or counter bored face having a surface 23 and an internal circular opening 24 which may be slightly greater than the largest dimension of the milled back shoulder or flange mounting structure, such as structures 19 or 21 at the other ends of the corresponding waveguides of the waveguide flange. Surrounding the shoulder 22 is an outer thread ring 26 positioned axially from the shoulder 22 a sufficient distance to retain the waveguide flanges and having an external thread 27. The narrow ledge surface 28 is provided extending outward from the shoulder section 22 with wrench flats 32 (FIG. 4) positioned in the lower portion thereof. The cylindrical portion 12 may be considered a cup shaped structure with an axial through opening or hole in the bottom surface. For aligning waveguide flanges, seals and any other units such as windows that are utilized, dowels or studs 36, 38, 40 and 42 are mounted in the outer surface 23 of the shoulder section 22 and are positioned to pass through the standard holes of the waveguide flange and have a diameter for providing a desired flange tight alignment.

The waveguide coupler of the invention is useful either for a square flange waveguide or for round flange waveguides. The positioning of the dowels and the diameter of the surface 29 with the ring 26 can be made consistent with any waveguide flanges such as those specified in military specs Mil F3922B which specifies the dimensions of the flanges and the holes and represents the standard of the present day waveguide art. For square waveguide flanges a large variety of Mil spec. waveguide sizes range from WR10 through WR112. The rotatable cylindrical portion 14 includes a shoulder 46 having a flat surface or counter bored face and with an internal axial opening 48 which may be the same size as the opening 24. A wrench flat 63 is provided on one axial side of the shoulder 46. External to the shoulder section 46 is an outer threaded ring 50 having internal female threads 52 to engage the threads 27. The outer surface of the rings 26 and 50 have knurled surfaces 52 and 53 for manual tightening. In both of the sections 12 and 14, respective slots 60 and 62 may be provided having a distance along the circumference sufficient to pass over the narrower dimension of the waveguide for assembly. The slots 60 and 62 may have sides parallel to the diameter of the respective cylindrical sections 12 and 14. For ease of assembly, the threads on the ring 50 of the portion 14 may be lead angle machined in the female section of the first thread.

Referring now principally to FIG. 3, the assembly of the coupler of the invention will be explained in further detail. The cylindrical portions 12 and 14 are first placed upon the waveguide as shown by means of the slots 60 and 62 and the holes in a flange 68 of the waveguide 20 are then inserted through the dowels 36, 38, 40 and 42. The axial opening 24 encloses the mounting shoulder (not shown) of the waveguide 20. If a pressure seal as is well known in the art is to be utilized, this is then inserted over the dowels followed by the flange 68. It is to be noted that the ring portion 12 is thus fixedly positioned relative to the waveguide and the ring portion 14 is then positioned adjacent to the flange 68 and over the milled back or mounting shoulder 13 and rotated onto the threaded portion of the ring portion 12 until the desired tight fit is provided. If additional units or plates such as a window 67 for preventing pressure loss along a waveguide path is to be utilized, this unit is also positioned over the dowels prior to bringing the flange 68 into position. It is to be noted that when removing the coupler, the portions 12 and 14 are separated from the flanges and one piece of waveguide may be slidably removed from the other flange. Thus, for example, if the waveguide section 20 is to be removed from a maze of fixed waveguides including the waveguide 20 with, for example, an additional waveguide coupler at the other end of the waveguide 20 (not shown) the two waveguide couplers can be removed from the waveguide section and it can be slidably removed without disturbing the rest of the microwave system. Similarly, an additional unit with the same dimensions may be inserted and coupled without disturbing the alignment of the rest of the system.

The waveguide coupler of the invention may be made of any suitable material such as aluminum, stainless steel, brass or bronze and the two ring sections may be developed by machining sections 12 and 14, drilling holes for the dowels and then inserting the dowels by a press fit, for example. The dowels may be positioned to coincide to the holes in either a square shape, substantially square shape, a round shape or any suitable flange shape. Also, the sections 12 and 14, sometimes hereinafter referred to as annular frame portions, may be made by casting such as drop forge casting with the dowels forced fitted into drilled holes thereafter and the sections being threaded by either a machine tool or in some arrangements by a powdered metal process. The dowels 36, 38, 40 and 42 themselves may be formed from a suitable machine operation with the ends, adapted for inserting into the holes in the waveguide flanges, being chamfered. Also, the coupler cylindrical sections may be formed of plastic, linen or paper base phenolic or cast iron powder and plastic.

Referring now to FIGS. 4 through 7, the illustrated configuration of the sections 12 and 14 will be explained in further detail. The cylindrical portion 12 is shown with dowels 36, 38, 40 and 42 inserted into holes 37, 39, 41 and 43 which pass completely through structure 22. These holes may be utilized to drive out the dowel pins to a desired length for any given application, or for replacement of the pins. The dowels such as 38 and 40 are made sufficiently long to extend axially forward from the forward surface of the ring 26 for ease of assembly.

To ensure that the dowel pins do not protrude through the flange 68 in such a manner as to interfere with a positive seal and locking action, in accordance with one embodiment of the subject invention the dowel pins are mounted in shoulder 22 so as to be slideable in the dimension normal to surface 23. This allows the dowel pins to be self-positioning in response to force from surface 46, during assembly of the coupler on the waveguide sections; i.e., the dowel pins are allowed to slide into shoulder 22 and position themselves to the proper length as the ring portion 14 is screwed or threadably engaged onto fixed ring assembly 12. To accommodate a greater flange joint thickness in subsequent applications, the dowel pins may be pulled out to the desired length; or as noted above, holes 37, 39, 41 and 43 may be utilized to drive the dowels outward to the desired length. This self-positioning feature for the dowel pins allows a wide range of applications for couplers in accordance with the invention. For example, the same coupler is adaptable for use in a waveguide flange to waveguide flange assembly; and in a waveguide flange, to waveguide RF seal, to waveguide flange assembly.

The above described self-positioning feature for the dowel pins may be implemented by providing a light press fit between the dowel pins and the body of shoulder 22. Additionally the interior surfaces of holes 37, 39, 41 and 43, such as surface 37a (FIG. 5) for example, as well as the ends of the dowel pins adapted for insertion therein, may be impregnated with a suitable lubricant. One well known process for such impregnation is to heat treat the parts after the proper surfaces have been coated with a liquid graphite lubricant, such as LUB-RITE or MOLY-COAT for example.

For couplers intended for applications having a predetermined fixed flange joint thickness, it is not necessary that the dowel pins be slideably mounted. For such couplers the dowel pins may be inserted into shoulder 22 by a medium press fit; and the ends of the dowels adapted for insertion into the shoulder, also may be chamfered. In this embodiment the length of the dowels are selected to ensure that the pins cannot contact surface 46 with the tightest fit desired.

In some arrangements where the coupler is to be used in a permanent installation, it may be desired to permanently construct the coupler on the waveguide section. This may be accomplished by omitting the formation of the slots 60 and 62 so that a continuous circle is provided as shown by dotted lines 80 and 82 for the unit 12, and by 84 and 86 for the portion 14.

In some arrangements in accordance with the invention it may be desired to provide a means and arrangement to hold the ring portion on the waveguide sections when they are disassembled. This may be accomplished by means of a teflon or plastic ring, indicated as 88, which may be forced onto the knurled surfaces to prevent the cylindrical portions 12 and 14 from falling off or disengaging from the waveguides 16 and 20. Another retaining arrangement that may be utilized in accordance with the invention is a latch 89 which may be a small flat elongated piece of metal anchored at a point 90 and latched at a point 92.

Also within the scope of the invention, locking threads may be utilized such as by providing a long portion or a cylindrical portion 102 of teflon or nylon which is forcefully fitted into a small drilled opening in the threads. Another locking arrangement that may be utilized in some operations would be a locked wire passing through small holes indicated as 108 and 110.

Although the principles of the invention are not limited to any particular dimensions or sizes, the following dimensions in inches may be utilized in a waveguide coupler for a WR 102 waveguide as is well known in the art, when using a pressure type seal:

| A | 1.510 | in. diam. |
|---|-------|-----------|
| B | 2.300 | in. diam. |
| C | 2.88  | in. diam. |

-Continued

| D | 0.88  | in. |
|---|-------|-----|
| E | 0.68  | in. |
| F | 0.455 | in. |
| G | 0.36  | in. |
| H | 0.50  | in. |
| J | 2.625 | in. diam. |
| K | 2.00  | in. hex |
| L | 0.93  | in. |
| M | 0.75  | in. |
| N | 0.640 | ± 0.001 in. |
| P | 0.670 | ± 0.001 in. |
| R | 0.600 | in. |
| S | 0.190 | + 0.030 in. <br> − 0.000 in. |

One test that has been run with the quick-disconnect coupler in accordance with the invention shows that at a frequency of 13410.3 Mhz (mega-hertz) the loss in decibels was 0.13888 for the clamp of the invention and for a frequency of 13413.6 mega-hertz the loss in decibels for the same waveguide with bolted flanges was 0.22317. Some other test data shows that at 9511.6 mega-hertz the coupler of the invention with a pressure seal had a loss in decibels of 4.3278 and for the coupler of the invention with soft steel flanges at 9576 mega-hertz the loss in decibels was found to be 4.25180. For bolting the soft steel flanges at a frequency of 9576 mega-hertz the loss in decibels was found to be 4.491 and for a frequency of 9515 mega-hertz the loss in decibels was found to be 4.298 for a bolted flange utilizing a pressure seal therebetween. Thus, the removable waveguide coupler of the invention provided complete electrical continuity while substantially eliminating RF leakage so that the RF loss was less than for the bolted flange connection of a permanent nature. Another advantage of the coupler of the invention is that a relatively leakproof seal is provided for pressure systems and it was found that a waveguide section coupled by a coupler in accordance with the invention with the waveguides sealed off, raised to a pressure of 30 PSIG and submerged in water, indicated substantially no evidence of leakage after 30 minutes.

Thus there has been provided a universal type waveguide flange aligning and quick-release assembly that provides a coupling with complete electrical continuity while substantially eliminating RF leakage. The coupler has first and second cylindrical or cup shaped bodies each with an internal annular shoulder and mutually engagable screw threads at the end of the cylinders opening adjacent to said shoulders. The coupling has been found to have electrical characteristics superior to permanent bolted couplings of waveguide systems. The coupler can be used with any standard flange type such as cover to cover, choke to cover, cover to seal to cover and may be utilized with a large variety of sizes of waveguide flanges, preferably when they are round or square. A further advantage of the invention is that the coupler can be removed from a pair of flanges and the flanges can be removed laterally from a maze of waveguides without disturbing the adjoining sections. The coupler of the invention is simple and requires relative small amount of complexity for its construction.

I claim:

1. A coupler device for coupling first and second waveguides each having a flange with a selected number of holes therethrough, and each flange having a mounting shoulder associated therewith, said coupler device comprising:

first and second annular frame portions each having an axial opening which is larger than the cross-section of the said flange mounting shoulders, and a shoulder extending outward from said inner circular opening and adapted for engaging the flanges of the waveguides;

a threaded ring portion on each of said first and second frame portions, said ring portions being threadably engagable for moving the shoulders of the two frame portions axially relative to each other; and a plurality of dowel pins positioned in the shoulder of said first frame portion so as to be adapted for passing through the holes in said flanges, and said dowel pins being slideably mounted in said first frame portion so as to allow the pins to be forced further into said first frame portion upon contact of said pins with the shoulder of said second frame portion during the threadable engagement of said frame portions.

2. The coupler device of claim 1 in which said first and second frame portions each have a circumferential slot formed therein, with the length of said slot being at least equal to the smallest external cross-sectional dimension of said waveguides.

3. A waveguide coupling assembly for coupling first and second waveguides each having a flange with a selected number of holes therethrough, and each flange having a mounting shoulder associated therewith, said coupling assembly comprising:

a first cylindrical portion having an inner circular opening with a diameter greater than the largest external dimension of said mounting shoulders, an annular shoulder surface extending outward from said inner circular opening and adapted for engaging the flange of one of said waveguides, a ring structure positioned at the outer circumference of said shoulder surface and having an external thread thereon;

a second cylindrical portion having an inner circular opening with a diameter greater than the largest external dimension of said mounting shoulders, an annular shoulder surface extending outward from said inner circular opening, and adapted for engaging the flange of the other of said waveguides, and a ring structure positioned at the outer circumference of said shoulder surface and having an internal thread adapted for engagement with the threads of the ring structure of said first portion; and a plurality of dowel pins positioned in the shoulder of said first cylindrical portion and extending axially so as to be adapted for passing through the holes in said waveguide flanges, and with said dowel pins being slideably mounted in said first cylindrical portion so as to allow the pins to be forced further into said first cylindrical portion upon contact of said pins with the shoulder of said second cylindrical portion during the threadable engagement of said first and second cylindrical portions.

4. The waveguide coupling assembly of claim 3 wherein said shoulder structure and said ring structure of said first and second portions each have a circumferential slot formed therein of a length equal to at least the smallest external dimension of said waveguides, so that said first and second portions may be positioned with the corresponding circular openings partially enclosing said waveguides.

5. The waveguide coupling assembly of claim 4 including wrench flats positioned axially on said first and second cylindrical portions at the ends opposite from said annular shoulder surfaces.

6. A waveguide coupler for coupling first and second waveguides each having a flange with a plurality of holes therethrough, and each flange having a mounting structure, said waveguide coupler comprising:

first and second cup portions each having an axial circular opening with a diameter greater than the largest cross-sectional dimension of said mounting structures and smaller than the largest cross-sectional dimension of said flanges, and a counter bored surface surrounded by an annular ring having threads thereon, said rings being threadably engagable for moving the counter bored surfaces of the two cup portions axially relative to each other; and a plurality of dowels mounted in the counter bored surface of said first cup portion and extending axially so as to be adapted for passing through the holes in said flanges, and with said dowel pins being slideably mounted in said first cup portion so as to allow the pins to be forced further into the counter bored surface of said portion upon contact of said pins with the counter bored surface of said second cup portion during the threadable engagement of said two cup portions.

* * * * *